Aug. 28, 1934.                C. R. MOON                1,971,574
                          OFF BEARING DELIVERY
                         Filed May 22, 1933        2 Sheets-Sheet 1
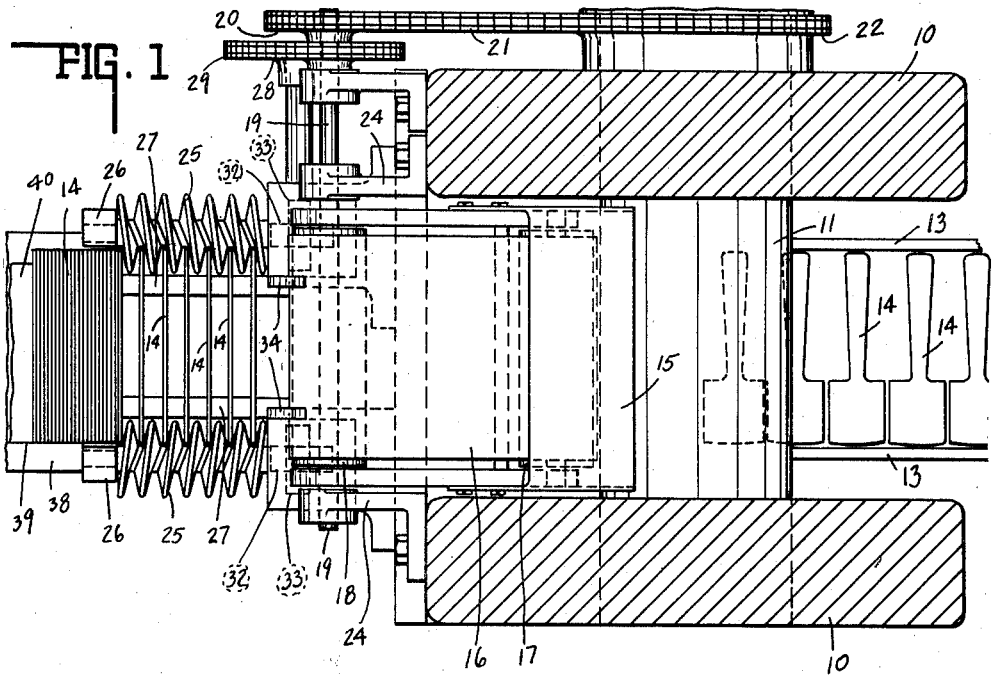
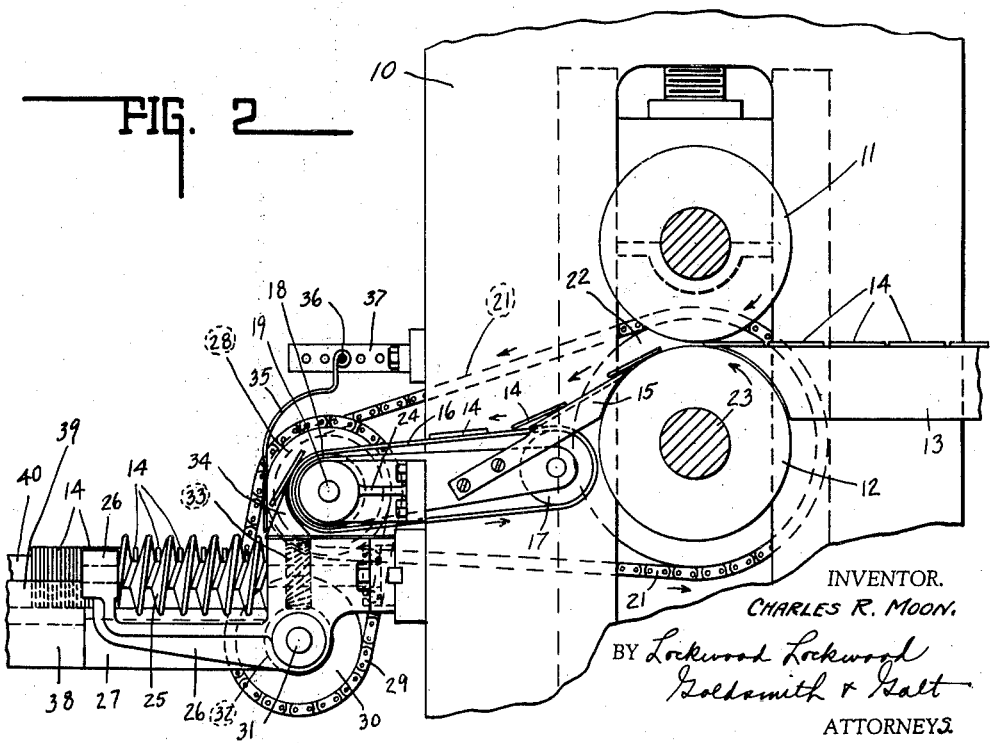
INVENTOR.
CHARLES R. MOON.
BY Lockwood Lockwood
Goldsmith & Galt
ATTORNEYS

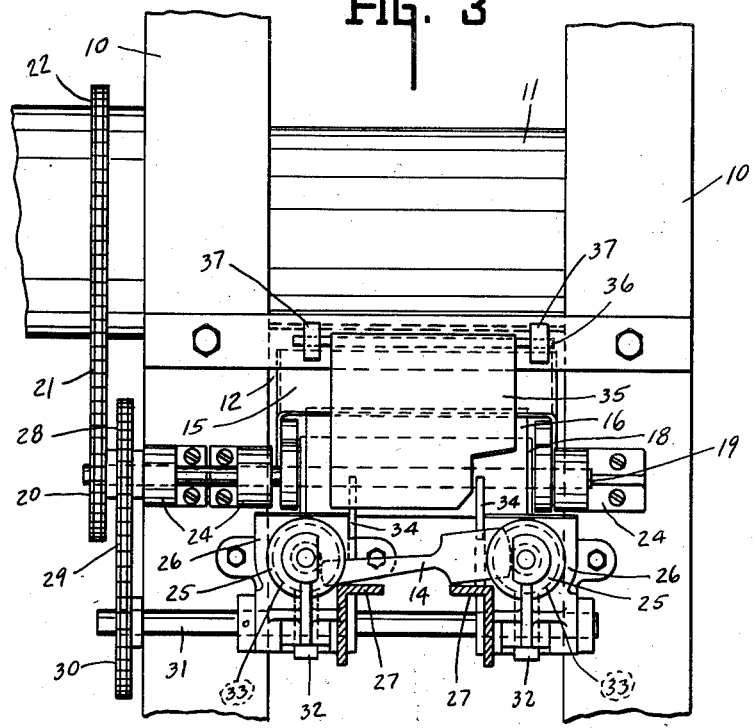

Patented Aug. 28, 1934

1,971,574

UNITED STATES PATENT OFFICE 1,971,574

OFF BEARING DELIVERY

Charles R. Moon, Muncie, Ind., assignor to Ontario Manufacturing Company, Muncie, Ind., a corporation Application May 22, 1933, Serial No. 672,368

1 Claim. (Cl. 214—7)

This invention relates to an off bearing delivery mechanism particularly adaptable for use in connection with roller breakdown machines through which metal blanks are passed.

As illustrated herein, the delivery mechanism is applied to a machine for breaking down metal blanks, employed in the manufacture of flat tableware and the like. In passing the metal blanks between the breakdown rollers, they are fed thereby to an off bearing conveyor. In arranging the blanks for the next operation, it is essential that they be stacked or packed in a certain relative position to each other, commonly performed by manual labor.

It is the object of this invention to provide means for receiving blanks fed sidewise from the breakdown machine and cause them to be fed into packed relation resting upon one side edge with the corresponding ends and sides adjacent each other. This is accomplished by carrying the blanks in the same relative positions in which they come out of the machine to a position where they are engaged and held vertically, supported on their side edges, between the spiral blades of a pair of screws which feed them in this position onto a supporting table with their proper sides and ends packed one against the other. In this position they may be conveniently removed or conveyed to another operation which may involve an automatic feed, in their proper stacked or packed arrangement. Thus, manual handling and sorting of the blanks is avoided.

The full nature of the invention will be understood from the accompanying drawings and the following description and claim:

In the drawings, Fig. 1 is a plan view showing the off bearing end of a breakdown machine embodying the invention. Fig. 2 is a side elevation thereof with portions shown in section. Fig. 3 is a front elevation of the off bearing side of the machine.

In the drawings there is illustrated a breakdown machine embodying the side frame supports 10 between which upper and lower rollers 11 and 12 are mounted. The breakdown rollers are driven, the upper roller clockwise and the lower roller counterclockwise, from any suitable source of power in the manner well known in the art. Depending upon the character of the breakdown desired for the metal blank fed through the machine, one of the rollers may be provided with raised or protruding surfaces, the character of which forms no part of this invention.

Adjacent the feed side of the machine there is a table 13 upon which the metal blanks 14 may be supported as they are fed sidewise between the rollers. The rollers engage the forward side edge of each blank as it is fed thereagainst, drawing the blank between the rollers, breaking down the metal therein, and discharging the blank at the off bearing side of the machine onto an inclined chute 15 down which it slides sidewise onto an endless conveyor belt 16. The conveyor belt passes about the rollers 17 and 18 upon which the belt is supported and driven. The roller 18 is supported upon and driven by a shaft 19 carrying a sprocket 20 driven by a chain 21 from a sprocket 22 upon a shaft 23 of the lower breakdown roller 12. The shaft 19 is supported in suitable bearings carried by brackets 24 secured to the rear face of the frame 10.

Extending laterally and rearwardly from the off bearing conveyor belt 16 there is a pair of conveyor screws 25. Said screws extend in parallel spaced relation with each other and have their bearings rotatably supported in the brackets 26 likewise rigidly mounted upon the rear side of the frame 10 below the brackets 24. Said brackets also support a track comprising the rails 27 extending between the conveyor screws and lengthwise thereof. The said screws are caused to rotate in opposite directions, the right-hand screw rotating in a clockwise direction and the left-hand screw in a counterclockwise direction, the pitch of the blades being opposed and at such angles as to feed from the machine rearwardly. For thus driving said screws there is a second sprocket 28 driven by the shaft 19, which sprocket drives a chain 29 passing about a sprocket 30 on a shaft 31. The shaft 31 is supported in suitable bearings in the brackets 26 and has keyed thereto worm gears 32 adapted to mesh with and drive the respective worm gears 33 on the screws 25.

Positioned between the off bearing belt 16 and the screws 25 there is a pair of guards 34 over which the blank 14 passes as it falls from the belt into position between the blades of the screws. A swinging apron 35 is pivotally mounted upon a rod 36 supported by brackets 37 on the frame 10, the apron swinging freely in position to be engaged by the blank as it is guided onto the screws for steadying it and preventing it from overturning during its fall into position. In continuation of the tracks 27 there is a table 38 for receiving the blanks as they are fed from the screws and from which they may be removed in any suitable manner in their packed or stacked relation. The table is provided with a longitudinal guiding flange 39 on one side thereof, and supports a sliding weight 40 against which the pack of blanks abut to hold them in proper position.

In operation the blanks are fed sidewise from the table 13 to the breakdown rollers between which they pass onto the slide 15 and thence onto the conveyor 16, retaining their same relative relation to each other. From the belt 16 they drop down between the screws 25 so that each end of the blank extends between opposite pairs of blades on the screws while slidably supported upon the track 27. In this vertical position they are caused to slide along the track by the advancing position of the screw blades until they engage the abutting block 40, or an intermediate pack of blanks held in the same vertical position thereby, upon their being free of the screws.

While the invention has been described particularly in respect to the handling of blanks passed sidewise between breakdown rollers, it is adaptable to other corresponding and similar uses wherein blanks are discharged from a processing machine and it is desirable that they be arranged in a prescribed manner.

The invention claimed is:

An off bearing delivery for a blank processing machine comprising a table for slidably supporting a pack of rigid metal blanks on edge, a pair of parallel spaced spiral conveyors having spiral flanges between which the ends of the blanks are engaged for conveying the same to said pack in the same relative position, means for simultaneously rotating said spiral conveyors, a slide extending longitudinally of said conveyors below the same for receiving and slidably supporting the blanks on edge while being conveyed by said conveyors, and a conveyor belt for receiving and feeding said blanks one at a time from the processing machine onto said last-mentioned slide between said conveyors.

CHARLES R. MOON.